United States Patent [19]

Sarich

[11] 4,079,083

[45] Mar. 14, 1978

[54] VANE TYPE ORBITAL ENGINE

[75] Inventor: Tony Ralph Sarich, Karrinyup, Australia

[73] Assignee: Ciba-Geigy Corporation, Ardsley, N.Y.

[21] Appl. No.: 654,935

[22] Filed: Feb. 3, 1976

[30] Foreign Application Priority Data

Feb. 3, 1975 Australia .............................. 0447/75

[51] Int. Cl.² .............................................. F01C 1/02
[52] U.S. Cl. .................................. 418/61 R; 418/235
[58] Field of Search ............... 418/61 R, 63, 139, 245, 418/248, 235

[56] References Cited

U.S. PATENT DOCUMENTS

| 910,175 | 1/1909 | Cole | 418/61 R |
|---|---|---|---|
| 2,674,234 | 4/1954 | Riggle | 418/245 X |
| 3,107,846 | 10/1963 | Mihalakis | 418/139 X |
| 3,730,655 | 5/1973 | Lamm | 418/235 X |
| 3,787,150 | 1/1974 | Sarich | 123/8.45 X |
| 3,809,024 | 5/1974 | Abbey | 418/139 X |
| 3,919,980 | 11/1975 | Veatch | 418/61 R X |

Primary Examiner—Carlton R. Croyle
Assistant Examiner—Michael Koczo, Jr.
Attorney, Agent, or Firm—Harry Falber

[57] ABSTRACT

An orbital type engine having a number of vanes supported for reciprocatory movement in the housing of the engine and supported in slots in the peripheral wall of the engine and the opposed end walls. The bearing areas between the vane and the respective slots in the housing comprising three independent areas arranged in a triangular formation one located in the slot in the peripheral wall of the engine and the other two in the slots in the respective end walls.

16 Claims, 3 Drawing Figures

VANE TYPE ORBITAL ENGINE

This invention relates to motors of the vane type including a housing, a piston member supported to move within the housing, and a plurality of vanes defining chambers between the housing and piston member, said chambers varying in volume in sequence in response to the relative movement between the piston member and housing. The motor may be in the form of a heat engine operating on internal or external combustion or a hydraulic or pneumatic motor.

There have been proposed numerous constructions of motors wherein the relative movement between the piston member and housing is either rotary or orbital, and a common problem with such motors is to provide adequate support for the vanes. In some of the proposed constructions, the vanes are slidably mounted in either the housing or piston member for reciprocatory movement, and may thus be supported at the opposite axial ends in slots parallel to the direction of reciprocation, and in a slot located transverse to said direction. One such construction is disclosed in my U.S. Pat. No. 3,787,150.

In my previously proposed construction the vane is supported over its full length in the respective directions which does result in some disadvantage. Since for manufacturing purposes the component supporting the vane cannot be produced in one piece, misalignment between the elements of the component must result upon assembly. If fine manufacturing tolerance are applied, production costs are high, while if more generous tolerances are permitted substantial misalignment may result with a consequent excess clearance or high friction.

It is therefore the principal object of this invention to provide a motor of the vane type wherein the vanes are adequately supported without adversely affecting the operation or manufacture of the engine.

With this object in view there is provided according to the present invention a motor of the vane type including a housing, a piston member supported on a shaft in the housing for relative movement therebetween, and a plurality of vanes arranged to define chambers between the housing and piston member that vary in volume in sequences in response to relative movement between the piston member and housing, characterised in that each vane is supported for reciprocatory movement in the piston member or housing at three locations arranged in a generally triangular formation in the plane of the vane.

Preferably the triangular formation of the support locations is such that two of the locations are spaced from each other in the axial direction of the engine and the third location is spaced radially from each of the other two.

Conveniently the housing is formed by a peripheral wall and opposed end walls, with each vane supported in respective slots in the peripheral and end walls for reciprocatory movement. One of the support locations is disposed within the slot in the peripheral wall and the other two locations are in the slots in the respective end walls.

The support locations in the slot in the housing peripheral wall may be formed by two bearing pads, one in each of the two opposite walls of the slot so as to engage opposite faces of the vane. The vane may have a body portion extending from the piston member periphery into the slot in the housing peripheral wall, and a leg portion attached to each axial end of the body portion. The leg portions are located in the slots in the housing end walls and extend inwardly of the periphery of the piston member. The other two support locations may be formed by bearing pads on the leg portions preferably inwardly of the piston member periphery. Each vane leg may be provided with an integral pin or journal to receive a lug which slidably engages a slot in the side wall of the piston member to control the movement of the vane during orbiting of the piston member.

By providing the vane with three support locations in a triangular formation the vane will readily take-up a position to distribute the load applied thereto between the three locations. The triangular formation of the support locations will also compensate for any small degree of misalignment between the bearing pads in the housing peripheral wall and the sides of the slots in the housing end walls on which the vane legs bear. This compensation for misalignment is further assisted by the flexibility in the vane legs. Thus the machining accuracy required of the housing and end plates is reduced to a level readily achieved by normal machining procedures.

In addition, since the three support locations are in a triangular formation, the vane can align with the respective support locations in the housing to obtain good surface contact between the mating surfaces resulting in a reduced rate of wear and reduced friction. Also if the vane is supported in the housing peripheral wall slot over the full width of the vane, any tendency for the vane to bend along the axial dimension due to the gas pressure is minimized. This reduction in distortion of the vane aids in reducing metal fatigue and allows a lighter vane construction.

The bearing pads may be formed as an integral part of the housing or vane, with or without a surface coating of bearing material, or may be an insert attached thereto. The insert may be made entirely of suitable bearing material such as phosphor bronze, or may be made of any other material of suitable mechanical and thermal properties with a layer of suitable bearing material on the load bearing face. Preferably the insert is attached to the housing end wall, since the latter experiences less thermal distortion during engine operation, and hence provides a more constant reference for the insert.

The present invention is particularly applicable to the internal combustion engine the subject of U.S. Pat. No. 3,787,150. In such an engine the vanes are supported in the housing for reciprocation in a direction normal to the plane of the shaft axis, and the vanes are connected to the piston member so that each vane may move relative thereto in a direction normal to the direction of reciprocation of the vane. The piston member is provided with flat surfaces on the periphery and the radially inner end of each vane engage one of the flat surfaces throughout the extend of the movement between the piston member and the vane. Each vane has a leg at each axial end which extends radially inward of the flat surfaces on the piston member periphery, and the legs carry lugs which slidably engage respective slots in the piston member, parallel to the flat surface which the vane engages. Two of the support locations for the vane are provided on the respective legs adjacent the respective lugs.

The invention will be more readily understood from the following description of an internal combustion engine incorporating the present invention as illustrated in the accompanying drawings.

In the drawings

FIG. 3 is a fragmentary view of one vane and adjacent portions of the housing and piston member.

Figure 1:
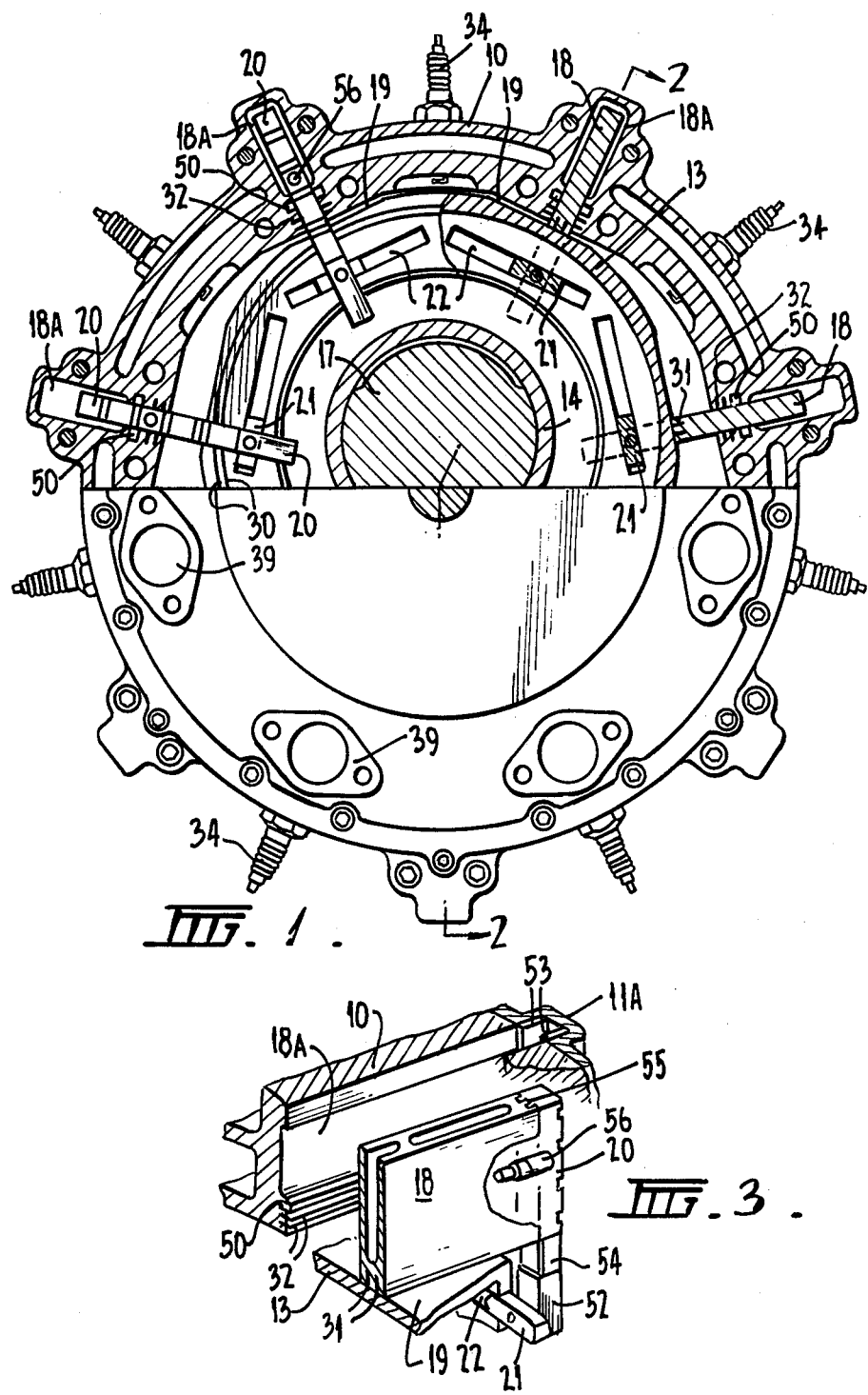
FIG. 1 is a view in the direction of the axis of the crankshaft with part of the end plate removed
Figure 2:
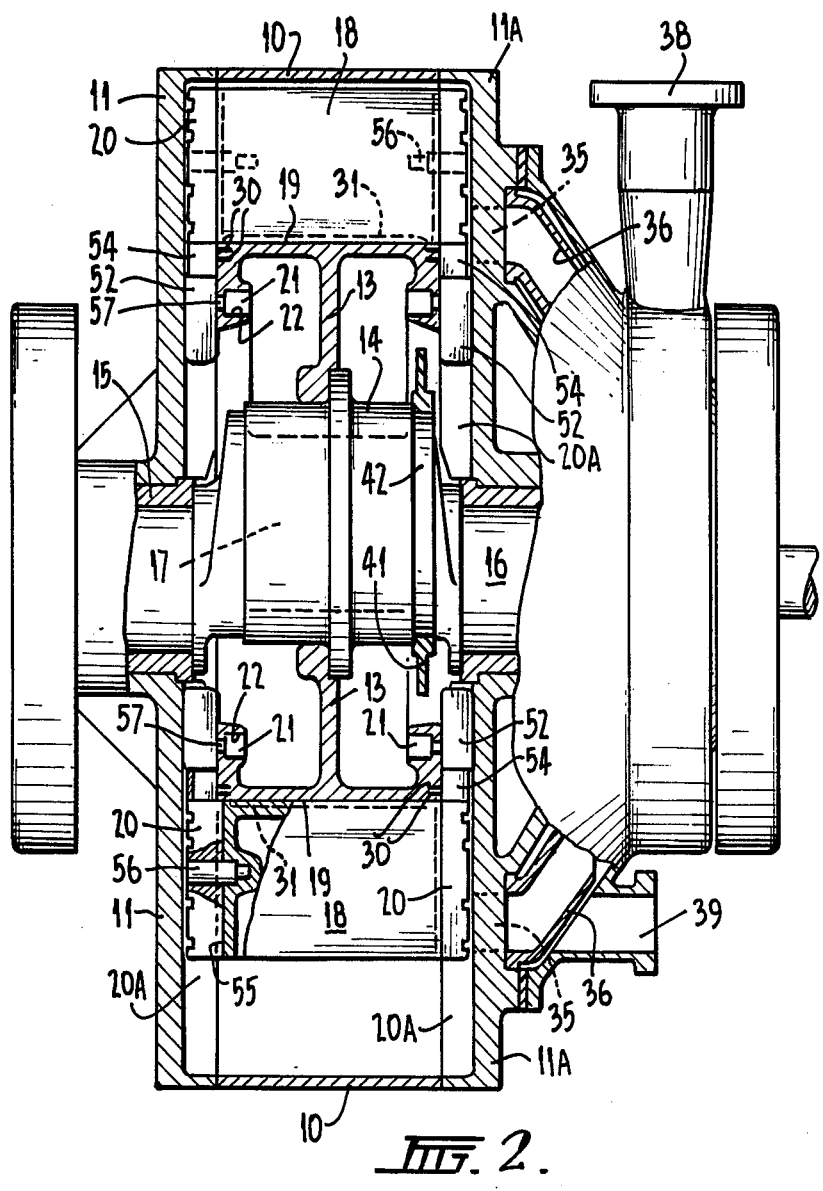
FIG. 2 is a sectional view along line 2—2 in FIG. 1

The engine comprises an outer peripheral casing 10 and opposed end plates 11, 11A attached by bolts to the outer casing 10. Bearings 15 mounted in the end plates rotatably support the crankshaft 16 for rotation about the axis of the outer casing 10. A piston member 13 and piston hub and bearing 14 are mounted on the eccentric journal 17 of the crankshaft 16. The space between the piston member 13 and the casing 10 is divided into a number of combustion chambers by the provision of vanes 18 which at the inner end abut respective flat faces 19 on the piston and are slidably supported into slots 18A in the outer casing 10.

The vanes have vane legs 20 which extend axially out beyond the piston member and radially inward from the circumference of the piston member. The vane legs 20 are slidably supported in radial slots in end plates 11 and 11A. The vane legs 20 have actuating lugs 21 pinned thereto and slidably engaged in slots 22 in the piston member end face to ensure that the vanes cannot move radially with respect to the piston member while allowing circumferential movement between the piston member and the vane along the flat faces 19.

Each combustion chamber is sealed by the provision of seals such as piston seals 30 between piston member 13 and end plates 11 and 11A, vane seals 31 between vane 18 and piston flat 19, and housing seals 32 between vane 18 and outer casing 10. Each combustion chamber is provided with a spark plug 34. Through a port 35 in the end plate 11A each chamber is connected with the disc valve 36 which is supported to rotate about the centre line of the outer casing 10. The number and position of the passages in the disc valve 36 is such that each chamber is connected with the inlet manifold 38, blanked off for compression and power stroke and then connected with the exhausts 39 in the desired sequence and with the proper timing.

It is to be understood that the engine may also operate with conventional poppet valve or on the two stroke cycle, and the modification necessary could be readily effected by a skilled engineer.

The stabilising plate 41 (control member) is rotatably supported on the journal 42, provided on the crankshaft 16, co-axial with the eccentric journal 17 carrying the piston member 13. The stabiliser plate 41 has an outwardly projecting tongue on the periphery thereof which is received in a radial slot in the piston member. The function of the stabiliser plate 41, and its construction and mounting is described in greater detail in my co-pending U.S. Pat. application Ser. No. 654,934, filed Feb. 3, 1976, and now U.S. Pat. No. 4,037,997.

In motors of this type it is necessary to ensure that the piston member orbits without rotation relative to the housing, that is, that it retains a constant angular relation with respect to the housing. In previous motors, such as that of my U.S. Pat. No. 3,787,150, the piston has been retained against such relative rotation by a secondary eccentric connection between the piston and the housing. This has certain disadvantages, and I have also accomplished this task in a novel manner by the use of a control member, or stabilising plate, which is journaled on the shaft coaxial with the piston member. The stabilising plate is connected to the housing so that is moves in an orbital path corresponding to the required orbital path of the piston. The stabilising plate is connected to the piston member also, so that relative angular movement between the two is prevented. Conveniently, the stabilising plate is connected to the housing by one or more secondary eccentrics, and is connected to the piston by a radially oriented tongue and slot connection. By this system compensation is provided dimensional changes resulting from thermal effects, which are primarily in the radial and axial direction of the shaft axis, by providing some clearance in the tongue and slot connection in the radial and axial directions. Furthermore, the stabilising plate can be located radially inward of the outer periphery of the piston member and therefore it is not exposed to the hot combustion gases. Thus, the thermal expansion itself is reduced.

As shown in FIG. 3 each vane 18 is supported for reciprocation in the housing by the pair of bearing strips 50 mounted in the walls of the slot 18A in the outer casing 10, and the bearing pads 52 on the radially inner portion of the legs 20 of the vane. The bearing strips 50 are preferably of phosphor bronze or other suitable bearing material, and are held in position by an interference fit in the groove in the housing or by suitable fastenings such as set screws. The faces of the vane 18 which engage the bearing strips 50 are plain faces without any particular surface treatment. It will be noted that the bearing strips 50 are positioned in the slot 18A outwardly from the seals 32 so that the bearing strips are not in direct contact with the combustion gases and consequently operate at a lower temperature.

The bearing pads 52 on the inner portion of the legs 20 of the vane are formed by increasing the width of the leg in the area of the pads so that only the pads contact the opposite walls of the radial slot 20A in the end plates of the housing. As it is difficult to form the bearing pads 52 of a different material to the remainder of the vane leg, the opposite walls of the slot 20A in which the bearing pads 52 slide may be formed by inserts 53, and the bearing pads 52 or inserts 53, or both, may be of a suitable bearing material such as phospher bronze.

A portion of the vane leg located between the bearing pads 52 and the outer periphery of the piston member 13 carries a control pad 54 which co-operates with the seals 30 in the side face of the piston member.

The axial end faces of the vanes and the mating face on the vane legs are formed with interfitting tongues and grooves 55 which transmit the load between the vanes and the vane legs in the circumferential direction which is the main direction of loading. Relative movement between the vane and the vane legs in the radial direction is prevented by a single pin 56 passing through the vane leg and screwed into the vane. The vane lug 21 which is slidably received in the slot 22 in the piston side wall is mounted upon the pin 57 which is formed as an integral part of the vane leg 20. The lug 21 is held on the integral pin 57 by a circlip or other suitable fastening.

It is to be understood that although the invention has been described with respect to an internal combustion engine it may also be applied to other forms of motors, such as hydraulic motors or steam engines, of the orbital type.

The claims defining the invention are as follows:

1. A motor of the vane type including a housing member, a shaft journalled for rotation in the housing member, a piston member disposed within the housing member, means for supporting the piston member on the shaft and imparting orbital movement to the piston member relative to the housing member as the shaft rotates, and a plurality of vanes arranged to define chambers between the housing member and the piston member that vary in volume in sequences in response to said orbital movement, each of the vanes being supported in one of the piston member and the housing member for reciprocatory movement relative thereto in the plane of the vane as the piston member orbits; characterized in that said motor further includes three bearing structures for supporting each of the vanes in said one member throughout said reciprocatory movement with the vane being supported in said one member solely by the three bearing structures, one of said bearing structures being spaced from the other two of said bearing structures in the radial direction of said motor throughout said reciprocatory movement, and said other two bearing structures being spaced from each other in the axial direction of said motor, and each of said bearing structures comprising at least two planar bearing surfaces in sliding contact with each other and formed respectively on the associated vane and said one member.

2. A motor as claimed in claim 1 wherein said motor further includes means connecting said vanes to the piston member so that each vane may move relative thereto in a direction normal to the direction of said reciprocatory movement of the vane relative to the housing member, the inner end of each of said vanes engaging a respective flat face on the periphery of the piston member parallel to the direction of relative movement between the vane and the piston member throughout said movement.

3. A motor as claimed in claim 2 wherein each of said vanes has a leg portion at each axial end extending radially inwardly of the periphery of the piston member, each of said leg portions having a boss formed thereon carrying an actuating lug, said lug slidably engaging a slot in the piston member parallel to the flat face engaged by the associated vane, said lugs sliding in the slots forming the connection between the vane and the piston member.

4. A motor as claimed in claim 2 wherein the housing member is formed by a peripheral wall and opposed end walls and each of the vanes is suported for said reciprocatory movement in slots in said peripheral and end walls, said one bearing structure being within the slot in the peripheral wall and said other two bearing structures being respectively within the slots in the end walls.

5. A motor as claimed in claim 1 wherein the housing member is formed by a peripheral wall and opposed end walls and each of the vanes is supported for said reciprocatory movement in slots in said peripheral and end walls, said one bearing structure being within the slot in the peripheral wall and said other two bearing structures being respectively within the slots in the end walls.

6. A motor as claimed in claim 5 wherein said one bearing structure includes two bearing pads one in each of two opposed walls of the peripheral wall slot, said pads engaging opposite faces of the associated vane parallel to the direction of said reciprocatory movement.

7. A motor as claimed in claim 6 wherein seal means are operatively interposed between said walls of the slot in the peripheral wall and said faces of the vane, and said bearing pads are located radially outwardly of said seal means relative to the piston member.

8. A motor as claimed in claim 6 wherein said bearing pads engage said faces of the vane over the full axial length of the vane.

9. A motor as claimed in claim 6 wherein the bearing pads are inserts mounted in the peripheral wall of the housing.

10. A motor as claimed in claim 5 wherein each of said other two bearing structures includes two bearing pads one on each of two opposite sides of the associated vane, said bearing pads engaging opposite walls of the end wall slot.

11. A motor as claimed in claim 10 wherein the vane has at each axial end thereof a portion extending radially inwardly of the periphery of the piston member and the two bearing pads comprising raised surfaces of opposite sides of said extending portion.

12. A motor as claimed in claim 10 wherein the vane has a body portion extending from the periphery of the piston member into the slot in the peripheral wall, and a leg portion attached to each axial end of the body portion and located respectively in the slots in the end walls, each of said leg portions extending radially inwardly of the periphery of the piston member and the two bearing pads comprising raised surfaces on opposite sides of the leg portion radially inwardly of the piston member periphery.

13. A motor as claimed in claim 10 wherein said walls of each slot in each end wall are each formed by an insert of bearing material at least over the portion thereof which engages the bearing pads on the vane.

14. A motor as claimed in claim 12 wherein each of said vane leg portions and the axial end of the associated vane body portion to which it is attached are provided with an interfitting tongue and groove formation extending in the direction of the length of the leg portion.

15. A motor as claimed in claim 10 wherein the bearing pads are formed by an insert or coating of suitable bearing material.

16. A motor as claimed in claim 10 wherein said opposite two sides of the vane include an insert or coating of suitable bearing material.

* * * * *

UNITED STATES PATENT AND TRADEMARK OFFICE
CERTIFICATE OF CORRECTION

PATENT NO. : 4,079,083
DATED : March 14, 1978
INVENTOR(S) : Tony Ralph Sarich

It is certified that error appears in the above—identified patent and that said Letters Patent is hereby corrected as shown below:

At "[73]" on the face of the patent, delete "Assignee: Ciba-Geigy Corporation, Ardsley, N.Y."

Signed and Sealed this

Twenty-ninth Day of September 1981

[SEAL]

Attest:

Attesting Officer

GERALD J. MOSSINGHOFF

Commissioner of Patents and Trademarks